July 29, 1958            A. L. DYER            2,845,596
PEAK READING VOLTMETER
Filed Aug. 10, 1953
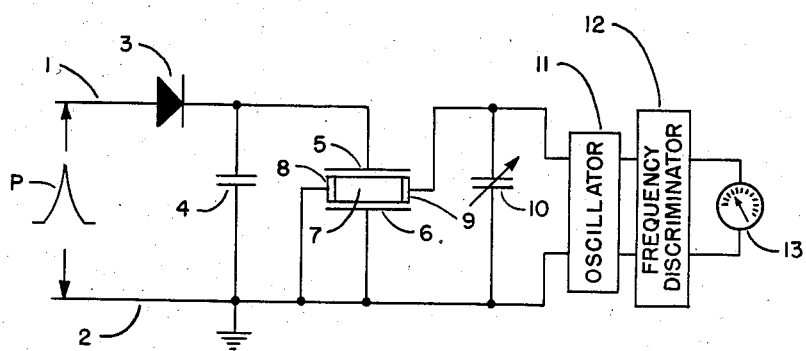
INVENTOR.
ALLEN L. DYER
BY
*Roland G. Anderson*
ATTORNEY

United States Patent Office 2,845,596
Patented July 29, 1958

2,845,596

PEAK READING VOLTMETER

Allen L. Dyer, Cincinnati, Ohio, assignor, by mesne assignments, to the United States of America as represented by the United States Atomic Energy Commission Application August 10, 1953, Serial No. 393,973

2 Claims. (Cl. 324—103)

This invention relates to an improvement in peak reading voltmeters, providing means for storing an electrical charge representative of the magnitude of a transient voltage pulse and thereafter measuring the stored charge drawing only negligible energy from the storage element.

There are in the art numerous devices capable of serving as peak reading voltmeters, but prior to the present invention none are known which preserve a record of the peak to be measured and permit measurement of this record at a convenient later instant.

A general object of the invention is thus to provide means for storing for an extended period an electrical record of a voltage pulse of which the peak is to be measured.

Another object of the invention is to provide means for measuring a stored voltage pulse with a minimum depletion of the stored energy.

Specifically, an object of the invention is to provide a voltage measuring circuit in which the voltage to be measured is enabled to vary the charge of a condenser capable of preserving the varied charge for a long interval of time.

How these and other objects are attained will be evident from the following description, read with reference to the accompanying drawing, the single figure of which illustrates an exemplary embodiment of the invention.

In the figure, voltage pulse P is applied between terminals 1 and 2. Through rectifier 3, which may be of any suitable type, pulse P charges condenser 4 and therewith the small capacitor comprising plates 5 and 6. Between these plates is suspended, by means not shown, a piezoelectric crystal 7, preferably of barium titanate or a like material of which the dielectric constant varies greatly with variation in applied voltage. Desirably, crystal 7 is so oriented that its electrical axis is at right angles to the planes of plates 5 and 6. With this orientation, the crystal's mechanical axis is parallel to the plates and to the crystal's long axis.

The arrival of pulse P at terminals 1 and 2 then brings about an elongation of crystal 7 along its mechanical axis as well as changing its dielectric constant, and plates 8 and 9 connected to crystal 7 form therewith a condenser of which the capacitance is greatly changed on the application of a voltage pulse across plates 5 and 6; the separation of these plates from each other and from the suspended crystal may be varied as desired to deal with voltage pulses of a wide range of magnitudes.

Condenser 4 is chosen of large capacitance thereby to store the voltage of pulse P and so enable the capacitance between plates 8 and 9 to be read some time after pulse P has disappeared.

A convenient arrangement for this reading is afforded by connecting plates 8 and 9 across the input of an oscillator 11 of which the output is fed to a frequency discriminator 12. Shunting the input of oscillator 11 is variable condenser 10, used (with no pulse applied to terminals 1 and 2) to fix the frequency of the oscillator for the undisturbed condition of crystal 7. Discriminator 12 then responds to changes in oscillation frequency as the capacitance of plates 8 and 9 changes due to the potential applied between plates 5 and 6.

By preliminary permanent adjustment of oscillator frequency, it is arranged that meter 13 on the output of discriminator 12 shall read zero when the normal condition of crystal 7 obtains. A pulse at terminals 1 and 2 changes this condition, and correspondingly meter 13 reads other than zero by an amount representative of the peak magnitude of the pulse. Calibration of the system is readily made by noting the reading of meter 13 as a function of known positive voltages (which may be steady) applied to terminals 1 and 2. Precautions against leakage must obviously be taken to insure a trustworthy reading of meter 13.

Rectifier 3 is preferably a high vacuum rectifier since its leakage resistance must be of the order of $10^{14}$ ohms. Oscillator 11 may be of conventional design, preferably of high input impedance in order that it shall not reflect on crystal 7 and plates 8 and 9. For other elements substitutions may be made, as will be evident to those skilled in the art to which this invention relates.

I claim:

1. A circuit for measuring the amplitude of a voltage pulse comprising in combination means for rectifying the pulse, a storage condenser, means for charging the condenser from the pulse, a piezoelectric crystal, said crystal being supported between a first pair of parallel condenser plates with variable spacing therefrom, means for applying the charge of the storage condenser to the first pair of parallel condenser plates to alter the dielectric constant of the crystal, a second pair of condenser plates affixed at each end of the crystal normally to the plates of the first pair, the plates of the second pair being connected in shunt to the input circuit of an oscillator of which the frequency is varied by alteration of the dielectric constant of the crystal and means for indicating the extent of the frequency variation.

2. A measuring circuit as in claim 1, in which the input circuit of the oscillator includes a variable capacitance whereby the oscillator frequency is adjusted to a desired value in the absence of a voltage pulse to be measured.

References Cited in the file of this patent

UNITED STATES PATENTS

| 1,611,716 | Brown | Dec. 21, 1926 |
| 1,931,028 | Marrison | Oct. 17, 1933 |
| 2,071,564 | Nicolson | Feb. 23, 1937 |
| 2,083,759 | Temple | June 15, 1937 |
| 2,243,921 | Rust et al. | June 3, 1941 |
| 2,306,555 | Mueller | Dec. 29, 1942 |
| 2,387,472 | Sontheimer | Oct. 23, 1945 |
| 2,470,893 | Hepp | May 24, 1949 |

FOREIGN PATENTS

| 533,154 | Germany | June 22, 1932 |